Dec. 15, 1959 G. D. STOUGH 2,917,139
RECTILINEARLY ADJUSTABLE RIGID ATTACHMENT
MEANS BETWEEN MEMBERS
Filed March 28, 1955

*INVENTOR.*
GERALD D. STOUGH
BY
Whittemore Hulbert & Belknap
ATTORNEYS

United States Patent Office 2,917,139
Patented Dec. 15, 1959

2,917,139

RECTILINEARLY ADJUSTABLE RIGID ATTACHMENT MEANS BETWEEN MEMBERS

Gerald D. Stough, Detroit, Mich., assignor to Whitehead & Kales Company, River Rouge, Mich., a corporation of Michigan Application March 28, 1955, Serial No. 497,176

1 Claim. (Cl. 189—36)

The invention relates to attachment means between members in which it is desirable to provide for rectilinear adjustments without loss in strength or rigidity of said attachment means. More specifically, the invention relates to the attachment of a rod or other elongated member to an anchoring member, and it is the object of the invention to provide adjustment means through which said rod may be lengthened or shortened by small increments in the portion thereof beyond the point of attachment.

With such an object in view, the invention consists of the construction as hereinafter set forth.

Figure 1:
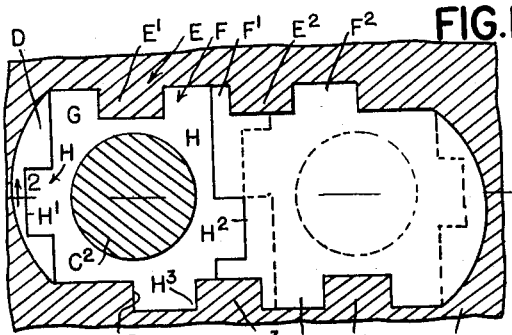
Fig. 1 is a longitudinal section through a recessed member together with an adjustable attachment for the same to an anchoring member.
Figure 6:
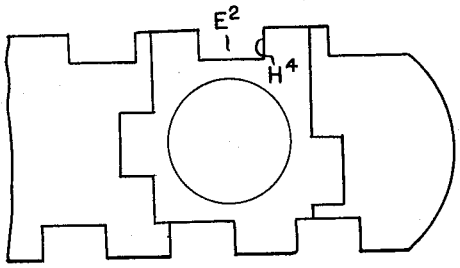

Figs. 3 to 9 inclusive are diagrammatic views similar to Fig. 1 showing successive positions of rectilinear adjustment of the attachment member.

Figure 2:
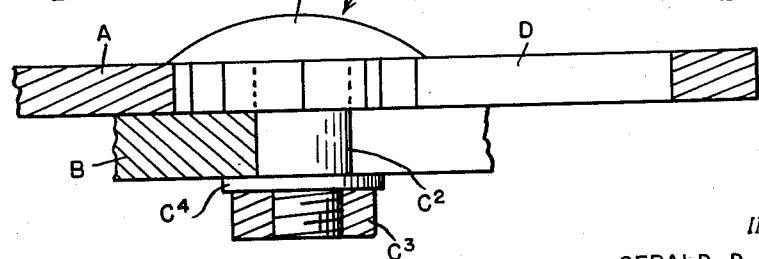
Fig. 2 is a section on line 2—2, Fig. 1.

As shown in Figs. 1 and 2, A is an elongated member, B is an anchoring member, and C is the attachment means therebetween which includes a bolt having a head C', a round shank $C^2$, a clamping nut $C^3$ engaging a threaded end portion of the bolt, and a washer $C^4$ between said nut and the member B. This specific construction is not essential to my invention but is one of the useful applications thereof. The member A is provided with an elongated recess D which at its opposite longitudinal edges is provided with a series of rack teeth E with interdental spaces F. The teeth on the opposite sides of the recess are offset from each other by a dimension which is one-half the width of a tooth. As shown, the teeth and spaces are substantially square but they may be varied in contour. As specifically illustrated, there are two rack teeth E' and $E_2$ on one side of the recess, and two other teeth $E^3$ and $E^4$ on the opposite side with corresponding spaces F', $F^2$, $F^3$, $F^4$. The attachment means C includes essentially a member G which fits within a portion of the recess D and has at opposite ends of transverse diameters thereof pairs of tooth-engaging portions H. The portions of each pair are correspondingly offset from each other and as specifically shown the portions H', $H^2$, and $H^3$ are projections fitting interdental spaces while the fourth portion $H^4$ is bifurcated to extend upon opposite sides of and to fit one of the teeth. The member G may be either integral with or sleeved upon the shank $C^2$ adjacent to the head C' and, as shown, the axis of said shank is at the intersection of the central planes of the tooth-engaging portions H' and $H^4$.

Figure 3:
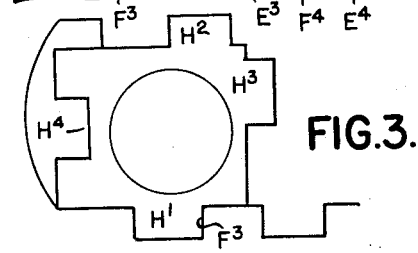
Figure 7:
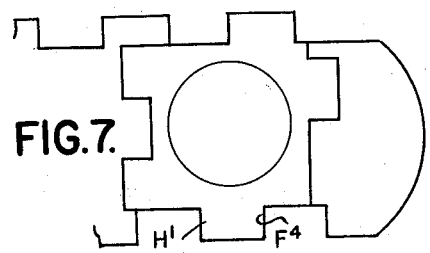
Figure 4:
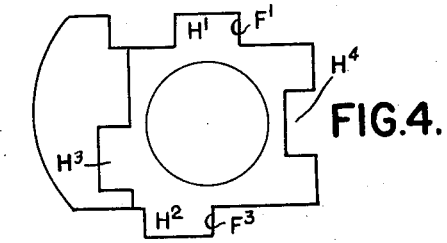
Figure 8:
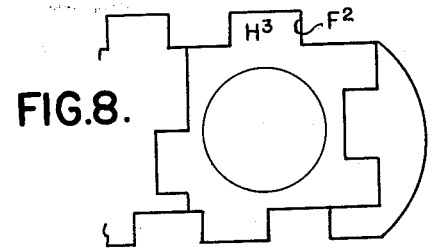
Figure 5:
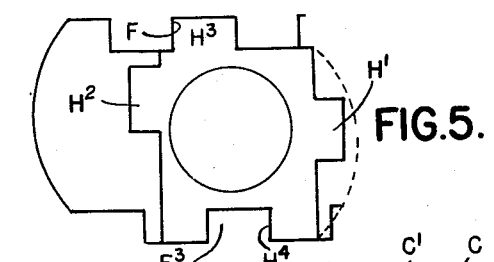
Figure 9:
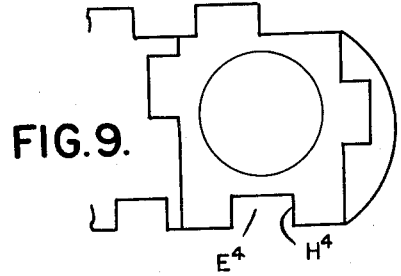

With the construction as above described, the member G may be variously positioned within the recess D. As shown in Fig. 1, the tooth-engaging portions $H^4$ and $H^3$ are respectively engaged with the tooth E' and the recess $F^3$. This will position said member at the left end of the recess D. In Fig. 3 the member G has been rotated in a counter-clockwise direction through one quarter turn from the position shown in Fig. 1. This brings the portion H' in engagement with the recess $F^3$ and the portion $H^2$ in engagement with the recess F', advancing the member G to the right a distance equal to one-half the width of a tooth E. In Fig. 4 the member G has been rotated through one-half a revolution from its position in Fig. 3 which engages the portion H' with the recess F' and the portion $H^2$ with the recess $F^3$, thereby advancing the block an equal amount further to the right. In Fig. 5 the block G had been turned in a clockwise direction through one quarter of a revolution which brings the portion $H^3$ in engagement with the recess F' and the portion $H^4$ in engagement with the tooth $E^3$, further advancing the member to the right an equal amount. In Figs. 6 to 9 inclusive the block G is progressively advanced to the right, its positions as to rotation being the same respectively as in Figs. 1 to 5 but the engagement being with other teeth and recesses. Thus in Fig. 9 the block will be at the right end of the recess D.

In each position of adjustment the attachment means C will be strongly connected to the member A while at the same time the intervals between successive positions are relatively small, being only one-half the width of a single tooth. This will permit of lengthening the rod beyond its point of attachment to the anchoring member.

What I claim as my invention is:

A longitudinally adjustable coupling between an elongated support member and an anchoring member, said support member having an elongated longitudinally extending opening therein, opposite sides of said opening being in the form of racks having alternate teeth and tooth spaces of identical configuration, the teeth in the rack at one side of said opening being longitudinally offset from the teeth in the rack at the other side of said opening by one-half the width of one tooth, a four-sided toothed block member pivoted to said anchoring member and shaped to interfit with the rack forms at opposite sides of said opening in any one of four positions displaced 90 degrees from each other, said block having single teeth at three sides thereof shaped to interfit in the tooth spaces of the racks, the fourth side of said block having two partial teeth spaced to define a tooth space shaped to receive and interfit with a rack tooth, the teeth and portions of the partial teeth adjacent the intermediate tooth space at opposite sides of said block being offset by one-half the width of a tooth.

References Cited in the file of this patent

UNITED STATES PATENTS

| 990,594 | Roach | Apr. 25, 1911 |
| 1,097,185 | Oehrle | May 19, 1914 |
| 1,619,853 | Correa | Mar. 8, 1927 |